United States Patent [19]

Ohba et al.

[11] Patent Number: 5,446,762

[45] Date of Patent: Aug. 29, 1995

[54] DATA DEMODULATION CIRCUIT FOR FSK MODULATED RF SIGNAL RECEIVER PROVIDING WIDE-BAND 90° BASEBAND PHASE SHIFTING

[75] Inventors: Motoi Ohba, Yokohama; Makoto Hasegawa, Tokyo; Mitsuo Makimoto, Yokohama, all of Japan

[73] Assignee: Matsushita Electric Industrial Co., Ltd., Osaka, Japan

[21] Appl. No.: 572,594

[22] Filed: Aug. 27, 1990

[30] Foreign Application Priority Data

Aug. 25, 1989 [JP] Japan ................... 1-218824

[51] Int. Cl.6 .................. H04L 27/14; H03D 3/18
[52] U.S. Cl. .................... 375/324; 375/328; 375/334; 329/300; 329/303
[58] Field of Search .............. 375/82, 88, 75, 44, 375/45, 80; 329/301, 303, 327, 300

[56] References Cited

U.S. PATENT DOCUMENTS

| | | | |
|---|---|---|---|
| 4,193,034 | 3/1980 | Vance | 375/88 |
| 4,254,503 | 3/1981 | Vance | 375/88 |
| 4,322,851 | 3/1982 | Vance | 375/80 |
| 4,462,107 | 7/1984 | Vance | 375/88 |
| 4,475,219 | 10/1984 | Puckette | 375/88 |
| 4,651,107 | 3/1987 | Akaiwa | 375/82 |
| 4,745,627 | 5/1988 | Gubser | 375/88 |
| 4,752,742 | 6/1988 | Akaiwa | 375/82 |
| 4,870,659 | 9/1989 | Oishi et al. | 375/88 |

FOREIGN PATENT DOCUMENTS

| | | |
|---|---|---|
| 0098649 | 1/1984 | European Pat. Off. |
| 2182827 | 5/1987 | United Kingdom . |
| 8603643 | 6/1986 | WIPO . |

*Primary Examiner*—Stephen Chin
*Assistant Examiner*—Tesfaldet Bocure
*Attorney, Agent, or Firm*—Lowe, Price, LeBlanc & Becker

[57] ABSTRACT

An FSK radio receiver of direct conversion type, which derives baseband in-phase and phase quadrature signals from a received FSK RF signal in respective mixers by applying local oscillator signals to the mixers differing in phase by 90°, in which wide-band baseband 90° phase shifting circuits formed of only digital logic elements phase shift the in-phase and phase quadrature signals to enable a demodulated digital data signal to be obtained by subsequent digital processing. In that processing, signals having a frequency that is double that of the in-phase and phase quadrature signals are derived and used to derive the demodulated data signal, ensuring high accuracy of detection and lowering the accuracy required for the local oscillator frequency.

10 Claims, 7 Drawing Sheets

DATA DEMODULATION CIRCUIT FOR FSK MODULATED RF SIGNAL RECEIVER PROVIDING WIDE-BAND 90° BASEBAND PHASE SHIFTING

BACKGROUND OF THE INVENTION

Field of Application

The present invention relates in general to a direct conversion radio receiver for a FSK (frequency shift keyed) RF (radio frequency) signal, and in particular to a direct conversion radio receiver having an improved circuit for executing 90° phase shifting between an I (in-phase) signal and a Q (phase quadrature) signal generated within such a radio receiver, to enable a demodulated digital signal to be subsequently derived.

Figure 1:
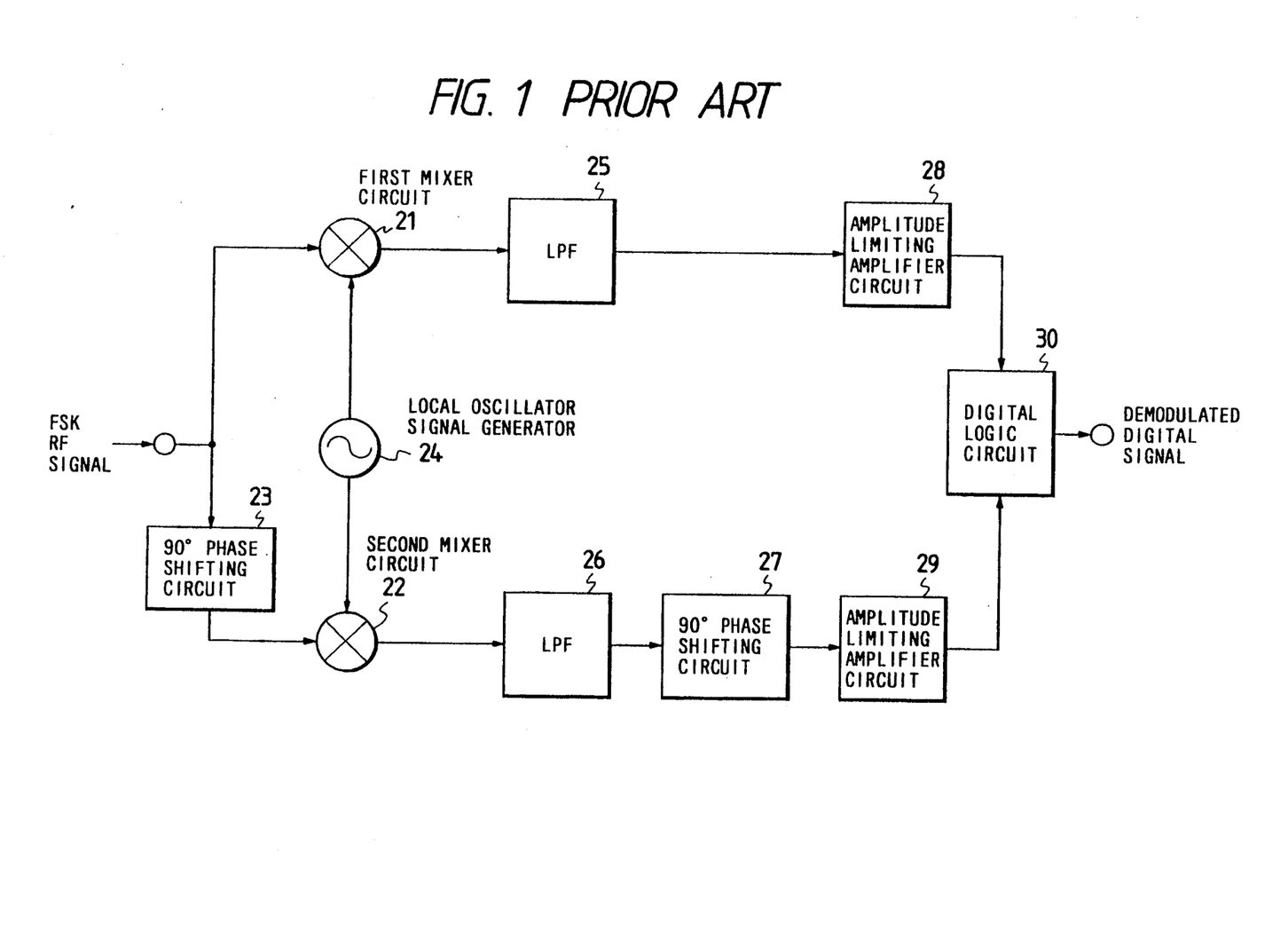
FIG. 1 is a block diagram of a prior art direct conversion FSK radio receiver circuit.

In recent years, direct conversion radio receivers for FSK signal reception have been proposed, which have the basic advantage over conventional frequency conversion (i.e. superheterodyne) receivers of being highly applicable to implementation, substantially entirely, as a single integrated circuit. In particular, direct conversion FSK radio receivers have been proposed in which it is only necessary to utilize a single local oscillator circuit, producing an output signal that is held close to the carrier frequency of the FSK signal. Such radio receivers are described in U.S. Pat. No. 4,193,034, and also in U.S. Pat. No. 4,462,107. The basic principles of such a direct conversion FSK radio receiver will be described referring to the latter U.S. patent. The first embodiment of that patent is illustrated in FIG. 1. Here, the input FSK RF signal consists of a carrier of frequency $f_c$ which is modulated by being successively shifted upward or downward in frequency by a fixed amount (that amount being designated as in the following) in accordance with an original digital signal, e.g. in accordance with whether the FSK signal represents a 0 or 1 bit. That RF signal, which can be expressed as $f_c+$ is applied directly to one input of a first mixer circuit 21, and through a 90° phase shift circuit 23 (i.e. which produces a phase shift of 90° at frequencies in the $f_c+$ range) to one input of a second mixer circuit 22. A local oscillator signal generating circuit 24 produces a local oscillator signal at a frequency that is very close to the carrier frequency $f_c$, which is applied to the respective other inputs of the first and second mixer circuits 21, 22 (although, as described, it is equally possible to apply the 90° phase shift to the local oscillator signal that is supplied to one of the mixers, rather than to the input RF signal). The respective output signals from the mixer circuits 21, 22 are passed through respective low pass filters 25 and 26. The output signals thereby obtained from the low pass filters 25 and 26 each have a frequency that is the difference between the frequencies of the local oscillator signal and the input RF signal, i.e. if the local oscillator frequency were exactly equal to the carrier frequency $f_c$, each of these output signals would have a frequency that is equal to the frequency shift amount $\delta$. The output signal from the low pass filter 26 is passed through a circuit which produces a phase shift of 90° at the frequency of that output signal, i.e. in the baseband frequency range, then is converted to a digital signal by an amplitude limiting amplifier circuit 29. The output signal from the low pass filter 25 is similarly converted to a digital signal by an amplitude limiting amplifier circuit 28. The output digital signals from the amplitude limiting amplifier circuits 28, 29 are then processed in a digital logic circuit 30, to obtain a demodulated digital output signal.

The operation of that circuit is as follows. Due to the 90° phase shift applied to the input of the mixer circuit 22, the output signals from the low pass filters 25, 26 will be in phase quadrature. However each time the direction of frequency shift of the input RF signal changes, i.e. from $+\delta$ to $-\delta$ or vice-versa, the phase relationship between these output signals from the low pass filters 25, 26 will change by 180°, i.e. the output signal from the low pass filter 27, generally referred to as the phase quadrature or Q signal, will shift in phase by 180° with respect to to the output signal from the low pass filter 25 (generally referred to as the in-phase or I signal). Thus, by phase shifting one of the I and Q signals by a fixed amount of 90°, these signals will be either mutually in-phase or 180° out of phase, in accordance with the direction of frequency shift of the input RF signal. Hence, a demodulated digital signal can be derived by digital processing of the I and Q signals. In the simplest case, the digital logic circuit could consist of a single exclusive-OR gate circuit.

If the frequency of the local oscillator signal is precisely identical to the carrier frequency $f_c$, then such a circuit would be satisfactory. However in a practical manufacturing situation, it is difficult to achieve a sufficiently high degree of accuracy for the local oscillator signal. If the local oscillator signal is higher than the carrier frequency of the FSK RF signal, then the I and Q signals from the low pass filters 25, 26 will each be increased in frequency beyond the theoretical value, while if the local oscillator signal becomes lower in frequency than the carrier frequency, the I and Q signals will be correspondingly lowered in frequency. Thus, it is necessary that the phase shifter 27 be of broad-band type, in order to cope with such frequency errors. Since each of the I and Q signals is a low frequency signal in the baseband frequency region, there will be difficulty in implementing a suitable wide-band 90° phase shifting circuit as the circuit 27, if a conventional analog type of phase shifting circuit is used, particularly when that circuit must be formed within an integrated circuit.

In the following, derivation of the aforementioned I and Q signals from an FSK RF signal will be referred to as quadrature demodulation.

Figure 5:
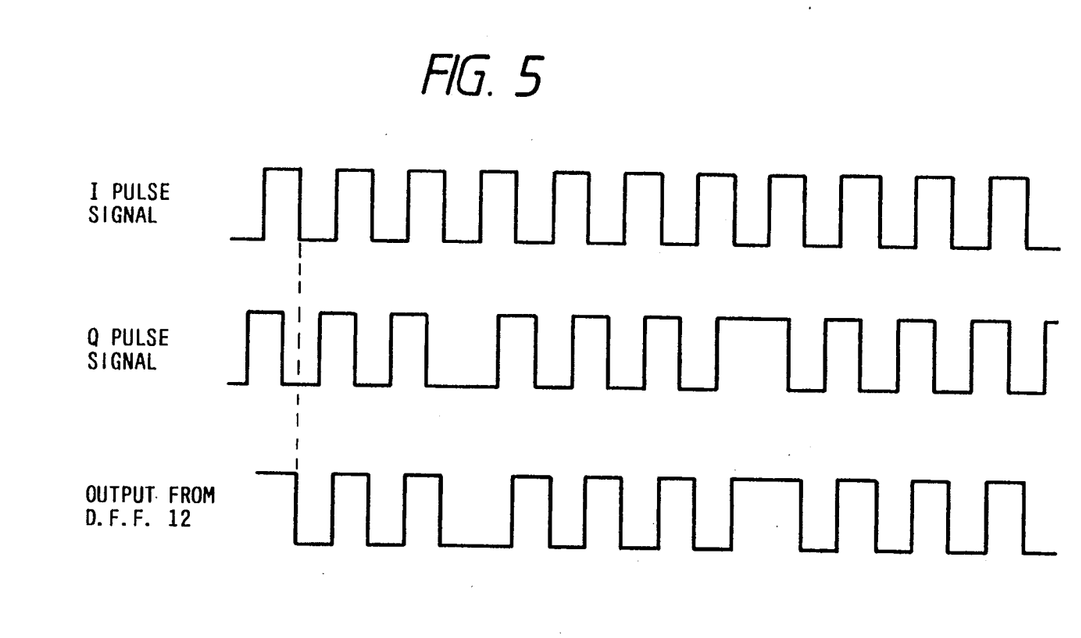

A second problem which arises with a receiver circuit of the form shown in FIG. 1 also results from frequency error of the local oscillator signal. Since the carrier signal is of very high frequency by comparison with the baseband frequency region, even a small amount of error between the local oscillator signal frequency and the carrier frequency $f_c$ will result in a significant change in the frequency of each of the I and Q signals obtained from the low pass filters 25, 26. In particular, if the local oscillator frequency is slightly lower than the carrier frequency, then the frequency of the I and Q signals will be lowered. Each time a logic level transition of the original digital signal (i.e. the signal that is to be demodulated) occurs, there will be a certain amount of delay before the mutual phase relationship between the I and Q signals becomes shifted by 180° as a result of the corresponding frequency shift of the RF carrier. As the frequency of the I and Q signals is lowered, the amount of that delay increases. Hence, for a specific value of data rate of that modulating digital signal (i.e. a specific value of bit period of that signal), there is a lower limit to the frequency of the I and Q signals beyond which processing these signals to obtain the final demodulated digital signal becomes impossible. In practice, the demodulation error rate of such a circuit rapidly increases as the frequency of the I and Q signals approaches that lower limit. Alternatively stated, the maximum anticipated amount of frequency error of the local oscillator signal sets a limit to the maximum data rate of FSK modulation that can be utilized, with the circuit of FIG. 5.

To overcome that second problem, the assignee of that prior art patent has proposed second and third embodiments, in which phase shifting by values other than 90° is executed, in addition to phase shifting by 90°, with the various signals thus obtained being processed in combination to obtain the demodulated digital signal, to enable an increase in the maximum data rate (or alternatively, maximum permissible local oscillator frequency error) to be achieved. However such a method does not overcome the first-mentioned problem of the difficulty of implementing wide-band phase shifting circuits operating in the baseband frequency range, and in particular the difficulty of implementing such phase shifting circuits within an integrated circuit.

SUMMARY OF THE INVENTION

It is one objective of the present invention to overcome the disadvantages of the prior art as set out above, by providing a direct conversion frequency shift keying (FSK) RF signal receiver circuit incorporating a 90° phase shifting circuit which provides highly accurate phase shifting in the baseband frequency region, over a wide frequency range.

The above objective is basically achieved by means of a phase shifting circuit that utilizes only digital logic elements, including a data type flip-flop whose output signal level is switched at each level transition of one of the I and Q signals of the receiver, in accordance with the current logic level of the other one of the I and Q signals. In that way, an output pulse train signal is obtained from the data type flip-flop which is fixedly delayed in phase with respect to one of the I and Q signals by 90°, and which is either in-phase or 180° out of phase with the other one of the I and Q signals in accordance with the FSK modulation, and so can be utilized for obtaining the desired demodulated digital signal. Such a circuit provides 90° phase shift operation over a very wide frequency range, with a simple configuration.

It is another objective of the present invention to provide a FSK data receiver circuit utilizing a single local oscillator signal for quadrature demodulation, in which the amount of permissible frequency error of the local oscillator frequency with respect to the RF carrier frequency of the received FSK signal is increased by comparison with the prior art.

More specifically, according to one aspect, the present invention provides a circuit including means for demodulating a modulated radio frequency (RF) signal to obtain an in-phase (I) pulse signal comprising a pulse train, a quadrature (Q) pulse signal comprising a pulse train varying between a condition of 90° phase advancement and 90° phase retardation with respect to the phase quadrature pulse signal in accordance with frequency modulation of the radio frequency signal, and baseband phase shifting circuit means for phase shifting one of the phase quadrature pulse signal and in-phase pulse signal by 90° with respect to the other one thereof, in which the baseband phase shifting circuit means comprises:

a bidirectional edge detection circuit for generating successive pulses in response to respective level transitions of a first one of the in-phase pulse signal and phase quadrature pulse signal; and a data-type flip-flop having a data input terminal coupled to receive a second one of the in-phase pulse signal and phase quadrature pulse signal and a clock input terminal coupled to receive the pulses produced from the bidirectional edge detection circuit;

the data type flip-flop thereby producing successive output pulses which vary between a condition of 0° and 180° phase shift with respect to the first one of the in-phase pulse signal and phase quadrature pulse signal in accordance with the frequency modulation of the radio frequency signal.

According to another aspect, the present invention comprises a data receiver circuit for demodulating a frequency shift keying modulated radio frequency (RF) including a source of a local oscillator signal, first mixer circuit means, phase shifting and signal distribution means for combining the radio frequency signal with the local oscillator signal in the first mixer circuit means to obtain an in-phase-signal (I) having a frequency determined in accordance with an amount of frequency shift of the radio frequency signal, second mixer circuit means, signal distribution means for combining the local oscillator signal with the radio frequency signal in the second mixer circuit means to obtain a phase quadrature signal (Q) which varies in phase with respect to the in-phase signal in accordance with a direction of the frequency shift, and output circuit means for processing the in-phase and phase quadrature signals to obtain a demodulated digital signal, in which the output circuit means comprises the aforementioned baseband phase shifting circuit means.

According to another aspect, the present invention provides a data receiver circuit for demodulating a frequency shift keying modulated radio frequency (RF) signal, including a source of a local oscillator signal, first mixer circuit means, phase shifting and signal distribution means for combining the radio frequency signal with the local oscillator signal in the first mixer circuit means to obtain an in-phase signal having a frequency determined in accordance with an amount of frequency shift of the radio frequency signal, second mixer circuit means, signal distribution means for combining the local oscillator signal with the radio frequency signal in the second mixer circuit means to obtain a phase quadrature signal which varies in phase with respect to the in-phase signal in accordance with a direction of the frequency shift, and output circuit means for processing the in-phase and phase quadrature signals to obtain a demodulated digital signal, in which the output circuit means comprises:

first and second limiter circuits for converting the in-phase and phase quadrature signals to an in-phase pulse signal and a phase quadrature pulse signal respectively;

a first bidirectional edge detection circuit for generating successive pulses in response to respective level transitions of the phase quadrature pulse signal;

a second bidirectional edge detection circuit for generating successive pulses in response to respective level transitions of the in-phase pulse signal;

a first data-type flip-flop having a data input terminal coupled to receive the in-phase pulse signal and a clock input terminal coupled to receive the pulses produced from the first bidirectional edge detection circuit;

a second data-type flip-flop having a data input terminal coupled to receive the phase quadrature pulse signal and a clock input terminal coupled to receive the pulses produced from the second bidirectional edge detection circuit;

first exclusive-OR gate circuit means coupled to receive the in-phase pulse signal and the output pulse signal from the first data type flip-flop;

second exclusive-OR gate circuit means coupled to receive the phase quadrature pulse signal and the output pulse signal from the second data type flip-flop;

third exclusive-OR gate circuit means coupled to receive the in-phase pulse signal and phase quadrature pulse signal;

fourth exclusive-OR gate circuit means coupled to receive respective output pulse signals produced from the first and third exclusive-OR gate circuit means, for producing a first demodulated digital signal;

fifth exclusive-OR gate circuit means coupled to receive respective output pulse signals produced from the second and third exclusive-OR gate circuit means, for producing a second demodulated digital signal; and demodulated signal combining circuit means for combining the first and second demodulated digital signals to obtain a final demodulated digital signal.

DESCRIPTION OF PREFERRED EMBODIMENTS

Figure 2:
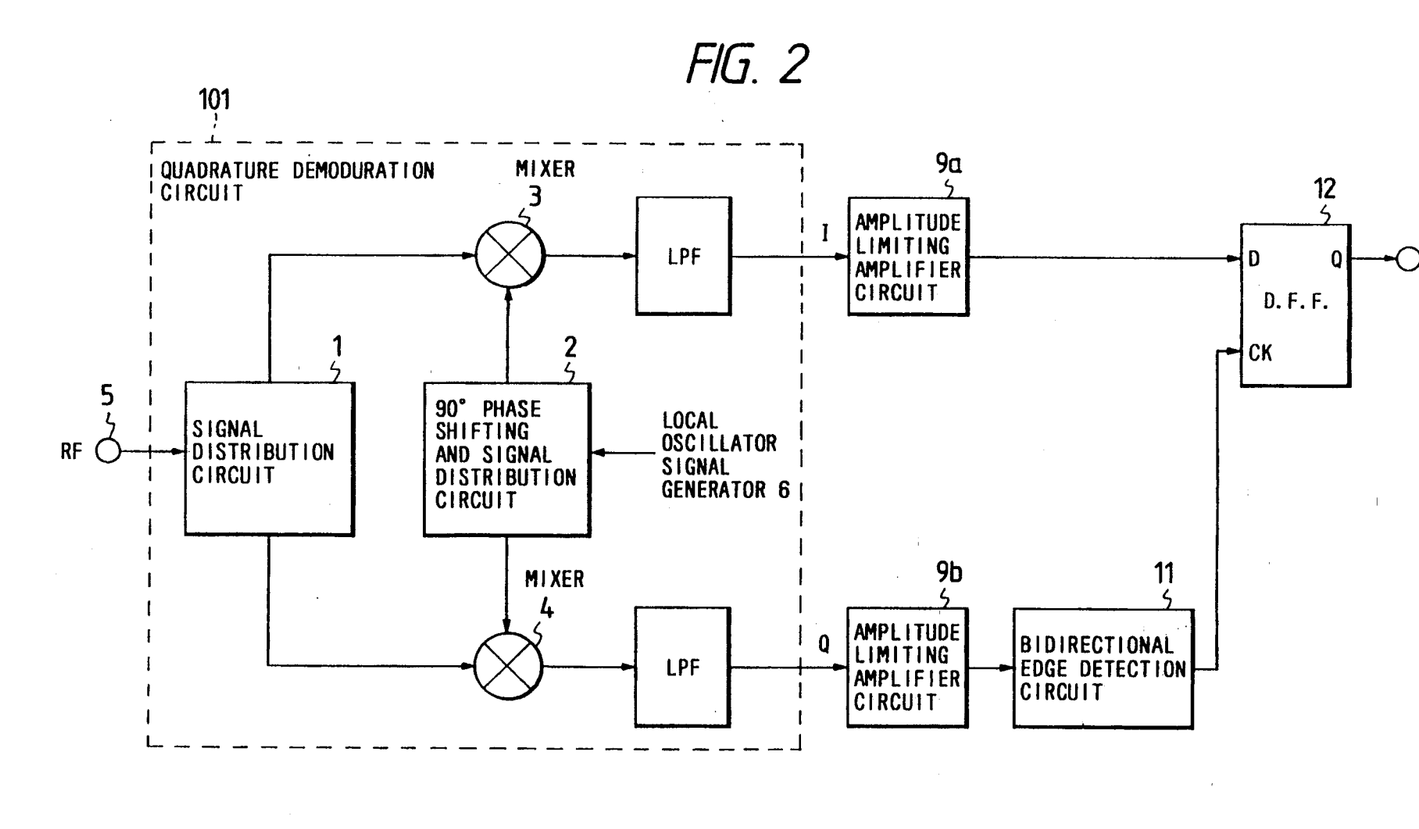
FIGS. 2 and 4 are block diagrams of a respective circuits containing first and second embodiments of a 90° phase shifting circuit according to the present invention, for use in an FSK radio receiver circuit.

FIG. 2 is a block diagram of a first embodiment of a frequency shift keying data receiver circuit according to the present invention. Numeral 101 denotes a quadrature demodulator circuit, for demodulating an FSK modulated RF signal to obtain an in-phase and phase quadrature signal in the baseband frequency range. The FSK modulated RF signal, whose frequency can be expressed as $f_c+$ (where $f_c$ is the carrier frequency and is an amount of modulation frequency shift), is supplied via an input terminal 5 to a signal distribution circuit 1 within the quadrature demodulator circuit 101. The signal distribution circuit 1 transfers the FSK RF signal to one input of a signal mixer circuit 3 and to one input of a mixer circuit 4, and performs an impedance matching function, for matching the source impedance of the RF signal to the input impedance of each mixer circuit. From circuit design considerations, it may be preferable for the signal distribution circuit 1 to supply the mixer circuit 3 and mixer circuit 4 with respective signals that differ in phase by 180°, but it is also possible for the phase difference to be made 0°. A local oscillator signal generator 6 generates a local oscillator signal having a frequency that is close to the carrier frequency of the RF signal, and supplies that local oscillator signal to a 90° phase shifting and signal distribution circuit 2. The 90° phase shifting and signal distribution circuit 2, in addition to the aforementioned impedance matching function, shifts the local oscillator signal in phase by 90° and supplies the phase shifted local oscillator signal to the other input of the mixer circuit 4, and supplies the local oscillator signal directly to the other input of the mixer circuit 3. It would be equally possible to interchange the positions of the 90° phase shifting and signal distribution circuit 2 and signal distribution circuit 1 from those shown in FIG. 2, so that a phase difference of 90° (or 270°) is established between the respective RF signals supplied to the mixer circuit 3 and mixer circuit 4, rather than between the local oscillator signals that are supplied to these mixer circuits. The resultant output signal from the mixer circuit 3 is passed through a low pass filter 7, to thereby obtain an in-phase (I) signal which, as described hereinabove for the prior art example of FIG. 1, has a frequency that is equal to the amount of frequency shift $\delta$ of the modulated RF signal, in the absence of any frequency error of the local oscillator signal. A phase quadrature (Q) signal is similarly obtained from a low pass filter 10 which receives the output signal from the mixer circuit 4. The I signal is then passed through an amplitude limiting amplifier circuit 9a, to be converted into a in-phase pulse signal comprising a train of bi-level pulses, referred to in the following as the I pulse signal. The Q signal is similarly processed by an amplitude limiting amplifier 9b to obtain a Q pulse signal. The Q pulse signal is then supplied to a bidirectional edge detection circuit 11, which generates a short-duration pulse in response to each logic level transition of the Q pulse signal. These output pulses from the bidirectional edge detection circuit 11 are applied to a clock input terminal of a data type flip-flop (hereinafter abbreviated to DFF) 12, while the I pulse signal is applied to the data input terminal of the DFF 12.

The I signal and the Q signal can be respectively expressed as follows:

I signal $= \cos[2\pi(\delta \pm \Delta f)t \pm \Theta_1]$

Q signal $= \pm \sin[2\pi(\delta \pm \Delta f)t \pm \Theta_1 + \Theta_2]$ where $\Delta f$ is the amount of frequency error of the local oscillator signal with respect to the carrier frequency, $\Theta_1$ is the amount of phase error between the local oscillator signal and the carrier, $\Theta_2$ is an amount of phase error introduced by the 90° phase shifting circuit (within the 90° phase shifting and signal distribution circuit 2) which shifts the local oscillator signal, and the input RF signal varies between the frequency values $(f_c+\delta)$ and $(f_c-\delta)$. Thus, for the case in which $\Theta_1 = \Theta$, the I signal does not contain phase information representing the modulation contents of the input RF signal, while the Q signal varies in phase with respect to the I signal in accordance with that modulation information, i.e. the Q signal preserves the modulation information. These phase relationships are also true of the I pulse signal and Q pulse signal that are obtained from the I signal and Q signal.

Figure 3:
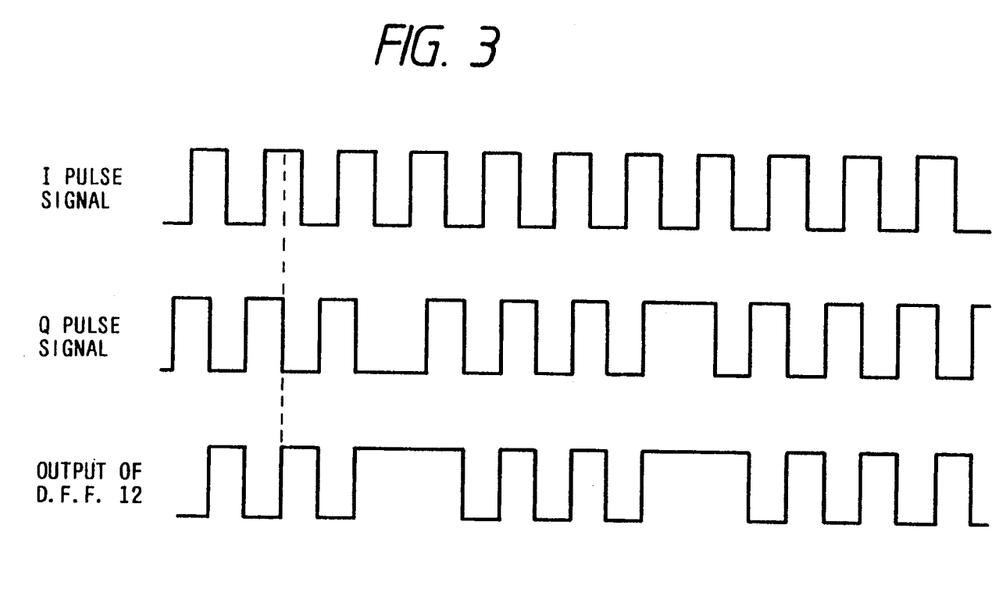
FIGS. 3 and 5 are waveform diagrams for illustrating the operation of the circuits of FIGS. 2 and 4 respectively.

The relationships between the I pulse signal produced from the amplitude limiting amplifier circuit 9a, the Q pulse signal produced from the amplitude limiting amplifier 9b and the output pulse signal produced from the DFF 12 are illustrated in the waveform diagram of FIG. 3. As shown, the output pulses from the DFF 12 are always delayed in phase by 90° with respect to the I pulse signal, the I pulse signal being fixed in phase, so that the output pulses from the DFF 12 vary between a condition of 90° phase advance and 90° phase delay with respect to the Q pulse signal (assuming an ideal condition in which the aforementioned phase errors are zero), in accordance with the modulation information in the FSK RF signal.

Thus, the combination of the bidirectional edge detection circuit 11 and DFF 12 functions in effect as a wide-band 90° phase shifting circuit for executing phase shifting in the baseband frequency range. In the prior art, baseband 90° phase shift circuits for this type of application have been configured for example using integrator circuits, differentiator circuits, time delay circuits, etc. However it is extremely difficult to achieve a uniform value of phase shift over a wide frequency range with such prior art methods, so that it has been necessary to adopt such measures as using a number of different phase shifting circuits which are switch-selected as appropriate. It can be understood that the accuracy of baseband 90° phase shifting by the circuit of FIG. 2 will be determined solely by the accuracy of phase shifting by a 90° phase shifting circuit within the 90° phase shifting and signal distribution circuit 2, which phase shifts the local oscillator signal that is supplied to the mixer circuit 3 and f as described above. Since the latter phase shifting circuit operates at the local oscillator frequency, i.e. in the carrier frequency range, and since the frequency range within which the phase shift must be constant is small (i.e. in relation to the carrier frequency), that phase shifting circuit can be easily realized. Even if there were a phase error of almost 90° in the local oscillator frequency range (i.e., a phase error whereby the 90° phase shifting and distribution circuit 2 does not produce an exact 90° phase shift between the two local oscillator output signals which is produces), this would only result in a change in the duty ratio of the I and Q pulse signals, so that data demodulation would still be possible.

It would be possible to configure an FSK data receiver by applying the Q pulse signal and the output signal from the DFF 12 to respective inputs of an exclusive-OR gate circuit. The required demodulated digital signal would thereby be obtained as output from that exclusive-OR gate circuit. However although such a data receiver would overcome the first of the problems set out hereinabove, i.e. eliminating the need for a wide-band 90° phase shifting circuit, the second problem to be solved (i.e. the difficulty of accurate demodulation of the digital signal when the frequency of the I and Q signals becomes excessively low due to frequency error of the local oscillator signal) would remain.

Figure 4:
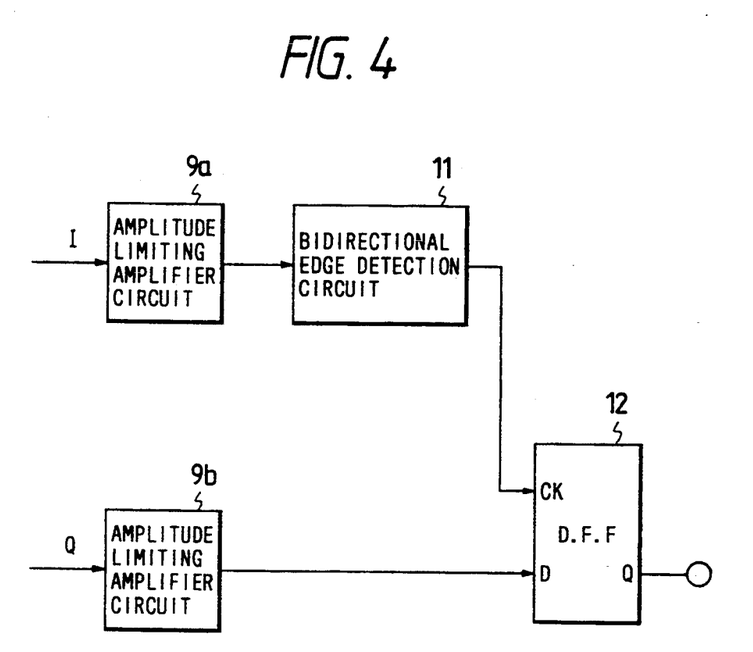

FIG. 4 shows a second embodiment of a baseband 90° phase shifting circuit for use in an FSK data receiver. In this case, the I pulse signal is transferred through the bidirectional edge detection circuit 11, and the resultant edge pulses supplied to the clock input terminal of the DFF 12, while the Q pulse signal is supplied to the data input terminal of the DFF 12. The resultant relationships between the I pulse signal, Q pulse signal and the output pulse signal from the DFF 12 are illustrated in the waveform diagram of FIG. 5. The operation is similar to that of the embodiment of FIG. 3. It can be understood that in this case, however, there is a reduced amount of delay time produced in the output signal from the DFF 12 at each occurrence of a frequency shift of the input RF signal, i.e. a greater number of pulses of the output signal from the DFF 12 occur during each data interval of the digital signal that is to be demodulated. As with the circuit of FIG. 6 it would be possible to configure a simple FSK data receiver using the circuit of FIG. 2, in this case by applying the I pulse signal and the output signal from the DFF 12 to respective input terminals of an exclusive-OR gate circuit.

Figure 6:
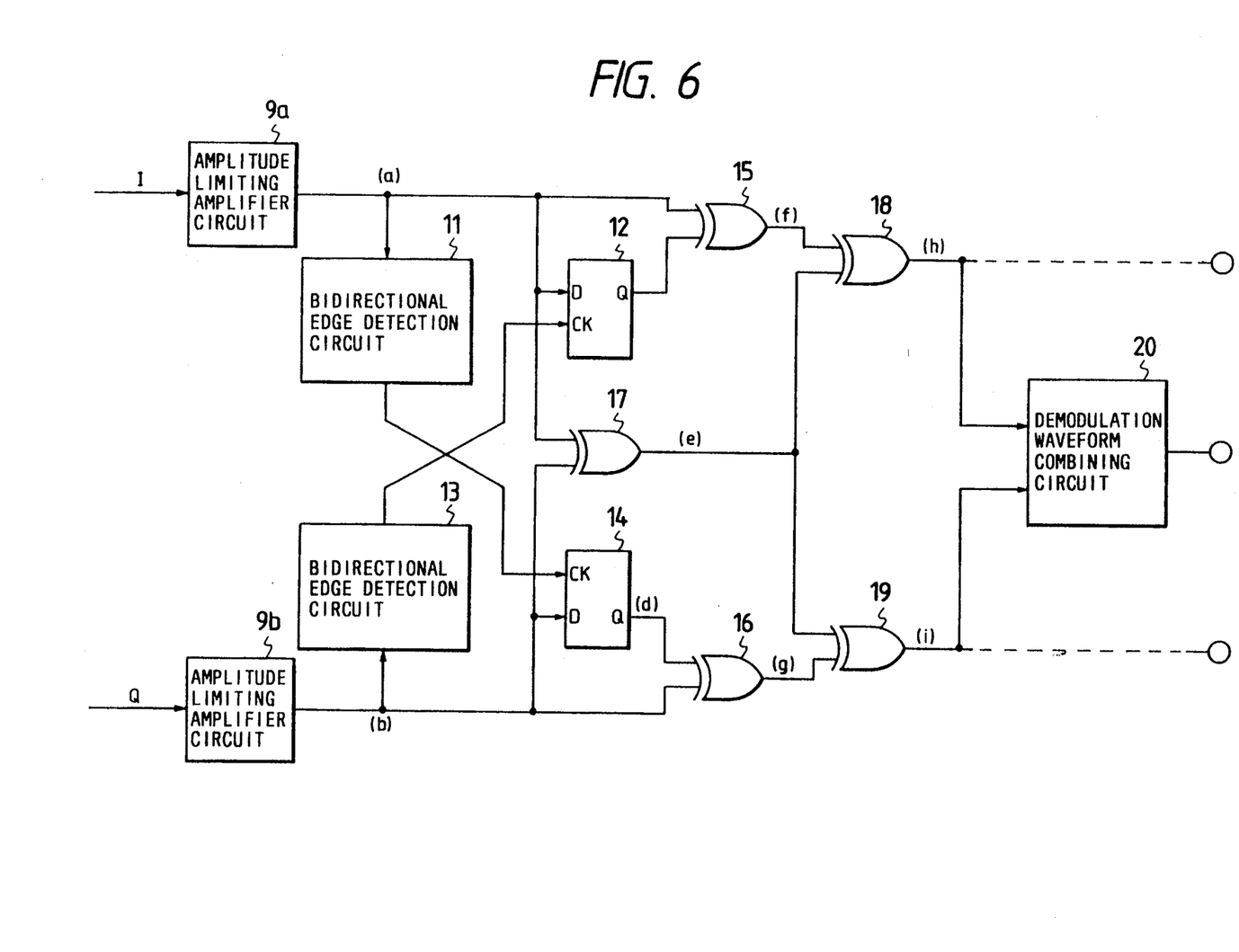
FIG. 6 is a partial block diagram of an embodiment of an FSK radio receiver circuit according to the present invention.

A preferred embodiment of an FSK data receiver circuit will be described referring to FIG. 6, which incorporates both of the baseband 90° phase shifting circuits described above, and applies digital processing to the output signals from these in conjunction with the I pulse signal and Q pulse signal to obtain a high degree of accuracy of digital signal demodulation, enabling satisfactory operation with a greater amount of local oscillator frequency error than is possible with a simple prior art type of direct conversion FSK data receiver (or, alternatively stated, enabling demodulation of a higher data rate of digital signal, for a specific maximum amount of local oscillator frequency error). In FIG. 6, the quadrature demodulation circuit 101 shown in FIG. 2, which produces the I and Q signals shown in FIG. 6 as described hereinabove, is omitted for simplicity of description. As in FIG. 2, 9a and 9b are amplitude limiting amplifier circuits for converting the in-phase signal and phase quadrature signal respectively to the I pulse signal and Q pulse signal, 11 and 12 are bidirectional edge detection circuits, 12 and 14 are data type flip-flops (DFFs), 15 to 19 are exclusive-OR gate circuits, and 20 is a demodulation waveform combining circuit.

Figure 7:
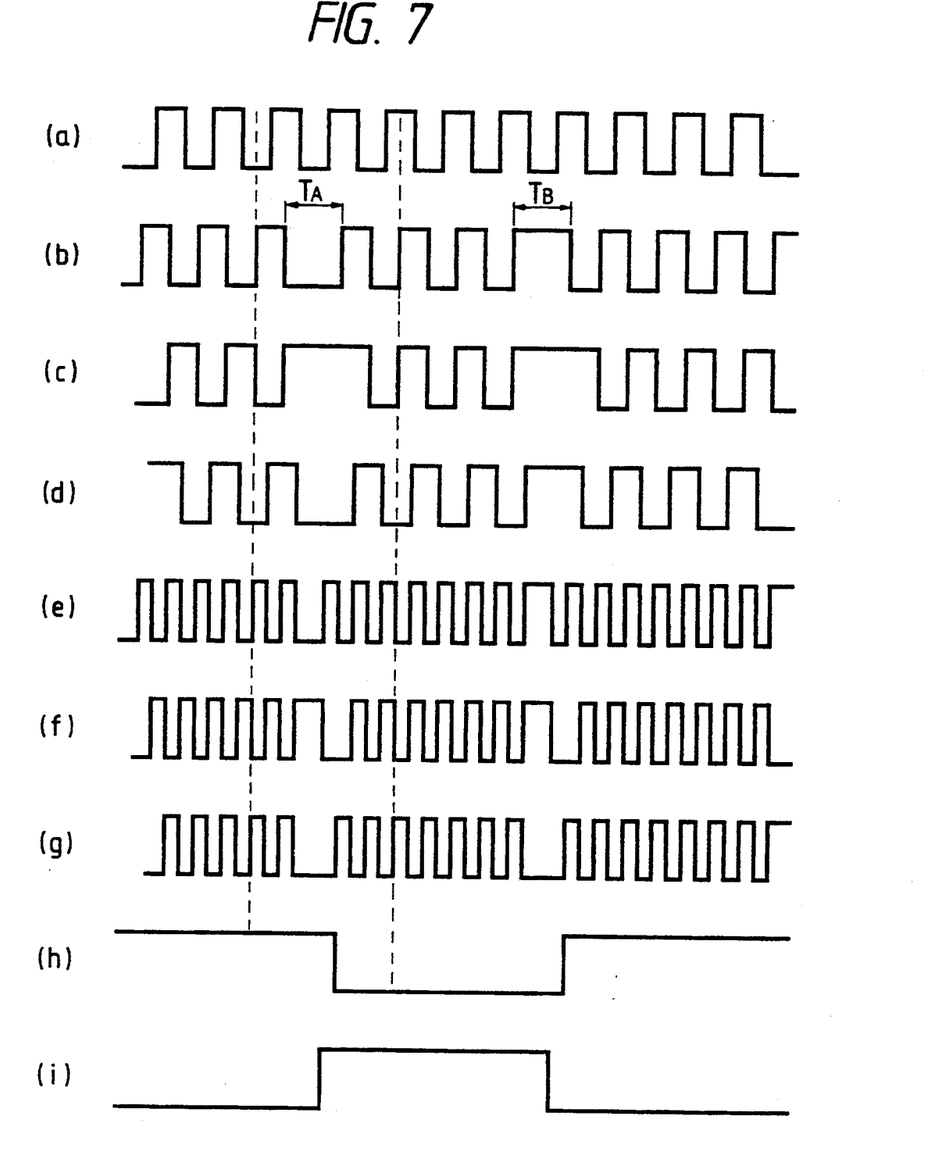
FIG. 7 is a waveform diagram for illustrating the operation of the circuit of FIG. 6.

Waveforms occurring at various points in the circuit of FIG. 6 are shown in in FIG. 7, designated as waveforms (a) to (i) respectively, with corresponding designations being provided in FIG. 7. The waveforms (a) and (b) are those of the I pulse signal and Q pulse signal respectively, which are mutually in phase quadrature. As described above, the I pulse signal does not vary in phase in accordance with frequency shifts of the modulated RF signal, while the Q pulse signal is inverted in phase each time a frequency shift of the received signal occurs. The I pulse signal and Q pulse signal are applied to respective bidirectional edge detection circuits 11 and 13, while the I pulse signal is also supplied to the data input terminal of the DFF 12 and the Q pulse signal is supplied to the data input terminal of the exclusive-OR gate circuit 14. Thus, the DFF 12 and bidirectional edge detection circuit 13 constitute a baseband 90° phase shifting circuit as described hereinabove for FIG. 2, while the bidirectional edge detection circuit 11 and exclusive-OR gate circuit 14 constitute a baseband 90° phase shifting circuit as described hereinabove for FIG. 4. The output signals from the DFFs 12 and 14 are shown as (c) and (d) in FIG. 7. The I pulse signal and the output signal from the DFF 12 is applied to respective inputs of a first exclusive-OR gate circuit 15, while the Q pulse signal and the output signal from the exclusive-OR gate circuit 14 is applied to respective inputs of a second exclusive-OR gate circuit 16. In addition, the I pulse signal and Q pulse signal are applied to respective inputs of a third exclusive-OR gate circuit 17. The output signals from the exclusive-OR gate circuits 15 and 16 each consists of pulses at a frequency which is twice that of the I pulse signal and Q pulse signal, with neither of these output signals being modulated in phase in accordance with frequency shifts of the received RF signal. The waveforms of these output signals from the exclusive-OR gate circuits 15 and 16 are shown as (f) and (g) in FIG. 7. The output signal from the exclusive- OR gate circuit 17 (shown as waveform (e) in FIG. 7) also consists of pulses at a frequency that is twice that of the pulses of the I pulse signal and Q pulse signal, but which are modulated in phase in accordance with frequency shifts of the received RF signal, i.e. which vary between a condition of being in phase with the output pulses from the exclusive-OR gate circuit 16 (and 180° out of phase with the output pulses from the exclusive-OR gate circuit 15) and a condition of being in phase with the output pulses from the exclusive-OR gate circuit 15 (and 180° out of phase with the output pulses from the exclusive-OR gate circuit 16). Thus, demodulation to obtain the original digital signal can be executed by inputting the output signals from the exclusive-OR gate circuits 15 and 17 to an exclusive-OR gate circuit 18, or by inputting the output signals from the exclusive-OR gate circuits 16 and 17 to an exclusive-OR gate circuit 19. The resultant output signals from the exclusive-OR gate circuits 18 and 19, shown as waveforms (h) and (i) in FIG. 7, are mutually inverted and also mutually displaced in phase by an amount equal to one half period of the double-frequency output pulses produced from the exclusive-OR gates 15 to 17.

Due to the frequency doubling that has been executed for the signals (e) and (f) or (e) and (g) that are used to obtain the final demodulated digital signal, i.e. are used to detect level transitions of that digital signal, a greater degree of resolution of that detection, and hence a higher accuracy of demodulation is achieved, than is possible with a simple digital processing circuit which directly operates on the I pulse signal and Q pulse signal. That is to say, although gaps (indicated as $T_A$, $T_B$ in waveform (b) of FIG. 7) occur in the successive pulses of the Q pulse signal each time the phase of the Q pulse signal is inverted as a result of a frequency shift of the input RF signal, with the duration of such gaps increasing in accordance with a lowering of the frequency of the I pulse signal and Q pulse signal, i.e. in accordance with an increase in error of the local oscillator frequency in a direction causing such a lowering of frequency, the effects of such gaps upon detection of the level transitions of the demodulated digital signal are greatly reduced by the circuit of FIG. 6, since as is apparent from FIG. 7 the corresponding gaps produced in the output pulse trains from the exclusive-OR gate circuits 17, 15 and 16 (i.e. waveforms (e), (f), (g)) are substantially shorter than the gaps $T_A$, $T_B$. Thus, a greater degree of frequency error in the local oscillator signal (or an increase in the data rate of the digital signal that is to be demodulated) becomes permissible.

In this embodiment, both of the demodulated digital signals (h) and (i) are derived, and are combined in a demodulated signal waveform combining circuit 20 to obtain a final demodulated digital signal that is applied to an output terminal 21. This combining of these signals (h) and (i) in the demodulated signal waveform combining circuit 20 is done in order to achieve a maximum accuracy of determining the timings of logic level transitions of the finally obtained demodulated digital signal. The demodulated signal waveform combining circuit 20 can for example consist simply of an operational amplifier circuit, with one of the signals (h) and (i) applied to the non-inverting input terminal of the amplifier, and the other signal applied to the inverting input terminal. However other circuit arrangements for the demodulated signal waveform combining circuit 20 can be envisaged.

However it can be understood that it would also be possible to process the demodulated digital signals (h) and (i) in various other ways, so that these signals could be outputted via respective output terminals 22 and 23, as indicated by the broken-line connections, to some processing circuits other than circuit 20 of FIG. 6.

Alternatively, the circuit could be simplified to use only one of the output signals (h) and (i), with some loss of accuracy of determining the level transition time points of the demodulated digital signal. In that case, for example, the bidirectional edge detection circuit 11, exclusive-OR gate circuit 14, exclusive-OR gate circuits 16 and 19, and the demodulated signal waveform combining circuit 20 shown in FIG. 6 could be omitted, with only the demodulated output signal from the exclusive-OR gate circuit 18 being utilized, or the bidirectional edge detection circuit 13, DFF 12, and exclusive-OR gate circuits 15, 18 and the demodulated signal waveform combining circuit 20 could be omitted, with only the output signal from the exclusive-OR gate circuit 19 being utilized, i.e. only a single baseband 90° phase shifting circuit would be utilized, with that being either a circuit that derives a signal which is fixedly delayed by 90° relative to the I pulse signal or a circuit that derives a signal which is fixedly delayed by 90° relative to the Q pulse signal.

From the above description it can be understood that it is a first feature of the present invention that the invention enables an FSK data receiver circuit to be configured which utilizes a baseband 90° phase shifting circuit that provides accuracy of phase shifting over a wide range of frequencies, with the 90° phase shifting being accomplished by using only digital logic circuit components.

It can be further understood that it is a second feature of the present invention that the invention enables an FSK data receiver circuit to be configured in which the requirements for frequency accuracy of a local oscillator of the receiver, with respect to the carrier frequency of the FSK RF signal, are substantially reduced. Due to these two features, the invention renders such an FSK data receiver circuit highly suitable for implementation in the form of an integrated circuit. The manufacture of such a data receiver will thereby be greatly facilitated.

What is claimed is:

1. In a circuit including means for demodulating a modulated radio frequency (RF) signal to obtain an in-phase (I) pulse signal comprising a pulse train and to obtain a quadrature (Q) pulse signal comprising a pulse train varying between a condition of 90° phase advancement and 90° phase retardation with respect to said phase quadrature pulse signal in accordance with frequency modulation of said radio frequency signal, and means for phase shifting one of said phase quadrature pulse signal and in-phase pulse signal by 90° with respect to the other of said phase quadrature pulse signal and in-phase pulse signal, the improvement wherein said means for 90° phase shifting comprises:

a bidirectional edge detection circuit for generating successive pulses in response to respective level transitions of a first pulse signal, said first pulse signal being a first one of said in-phase pulse signal and phase quadrature pulse signal; and     a D-type flip-flop having a data input terminal coupled to receive a second pulse signal, said second pulse signal being a second one of said in-phase pulse signal and phase quadrature pulse signal, and a clock input terminal coupled to receive said pulses generated by said bidirectional edge detection circuit, whereby said second pulse signal is sampled at level transitions of said first pulse signal;

said D-type flip-flop thereby producing successive output pulses which are 90° phase shifted with respect to said second pulse signal.

2. A circuit in accordance with claim 1, wherein said first pulse signal comprises said phase quadrature pulse signal and said second pulse signal comprises said in-phase pulse signal, said D-type flip-flop connected to sample said in-phase pulse signal at level transitions of said phase quadrature pulse signal.

3. A circuit in accordance with claim 1, wherein said first pulse signal comprises said in-phase pulse signal and said second pulse signal comprises said phase quadrature pulse signal, said D-type flip-flop connected to sample said phase quadrature pulse signal at level transitions of said in-phase pulse signal.

4. A circuit in accordance with claim 1, wherein said first one of said in-phase pulse signal and said phase quadrature pulse signal and said second one of said in-phase pulse signal and said phase quadrature pulse signal are different from each other, said D-type flip-flop connected to sample one of said in-phase pulse signal and said phase quadrature pulse signal at level transitions of the other of said in-phase pulse signal and said phase quadrature pulse signal.

5. In a data receiver circuit for demodulating a frequency shift keying modulated radio frequency (RF) signal, including a source of a local oscillator signal, first mixer circuit means, phase shifting and signal distribution means for combining said radio frequency signal with said local oscillator signal in said first mixer circuit means to obtain an in-phase signal having a frequency determined in accordance with an amount of frequency shift of said radio frequency signal, second mixer circuit means, signal distribution means for combining said local oscillator signal with said radio frequency signal in said second mixer circuit means to obtain a phase quadrature signal which varies in phase with respect to said in-phase signal in accordance with a direction of said frequency shift, and output circuit means for processing said in-phase and phase quadrature signals to obtain a demodulated digital signal, the improvement wherein said output circuit means comprises:

first and second limiter circuits for respectively converting said in-phase and phase quadrature signals to an in-phase pulse signal and a phase quadrature pulse signal respectively;

a bidirectional edge detection circuit for generating successive pulses in response to respective level transitions of a first pulse signal, said first pulse signal being a first one of said in-phase pulse signal and phase quadrature pulse signal;

a D-type flip-flop having a data input terminal coupled to receive a second pulse signal, said second pulse signal being a second one of said in-phase pulse signal and phase quadrature pulse signal and a clock input terminal coupled to receive said pulses generated by said bidirectional edge detection circuit, said D-type flip-flop producing an output pulse signal; and logic circuit means for combining said output pulse signal produced by said D-type flip-flop with at least one of said first and second signals to obtain said demodulated digital signal.

6. The improvement according to claim 5, in which said logic circuit means comprises:

first exclusive-OR gate circuit means for receiving as inputs said output pulse signal from the D-type flip-flop and said second pulse signal, for producing a first output pulse signal;

second exclusive-OR gate circuit means for receiving as inputs said first and second signals for producing a second output pulse signal; and third exclusive-OR gate circuit means for receiving as inputs said first and second output pulse signals produced by said first and second exclusive-OR gate circuit means., respectively, and for outputting said demodulated digital signal.

7. A circuit in accordance with claim 5, wherein said first pulse signal comprises said phase quadrature pulse signal and said second pulse signal comprises said in-phase pulse signal, said D-type flip-flop connected to sample said in-phase pulse signal at level transitions of said phase quadrature pulse signal.

8. A circuit in accordance with claim 5, wherein said first pulse signal comprises said in-phase pulse signal and said second pulse signal comprises said phase quadrature pulse signal, said D-type flip-flop connected to sample said phase quadrature pulse signal at level transitions of said in-phase pulse signal.

9. A circuit in accordance with claim 5, wherein said first one of said in-phase pulse signal and said phase quadrature pulse signal and said second one of said in-phase pulse signal and said phase quadrature pulse signal are different from each other, said D-type flip-flop connected to sample one of said in-phase pulse signal and said phase quadrature pulse signal at level transitions of the other of said in-phase pulse signal and said phase quadrature pulse signal.

10. In a data receiver circuit for demodulating a frequency shift keying modulated radio frequency (RF) signal, including a source of a local oscillator signal, first mixer circuit means, phase shifting and signal distribution means for combining said radio frequency signal with said local oscillator signal in said first mixer circuit means to obtain an in-phase signal having a frequency determined in accordance with an amount of frequency shift of said radio frequency signal, second mixer circuit means, signal distribution mean for combining said local oscillator signal with said radio frequency signal in said second mixer circuit means to obtain a phase quadrature signal which varies in phase with respect to said in-phase signal in accordance with a direction of said frequency shift, and output circuit means for processing said in-phase and phase quadrature signals to obtain a demodulated digital signal, the improvement wherein said output circuit means comprises:

first and second limiter circuits for respectively converting said in-phase and phase quadrature signals to an in-phase pulse signal and a phase quadrature pulse signal respectively;

a first bidirectional edge detection circuit for generating successive first pulses in response to respective level transitions of said phase quadrature pulse signal;

a second bidirectional edge detection circuit for generating successive second pulses in response to respective level transitions of said in-phase pulse signal;

a first D-type flip-flop having a data input terminal coupled to receive said in-phase pulse signal and a clock input terminal coupled to receive said successive first pulses generated by said first bidirectional edge detection circuit, for producing a first output pulse signal;

a second D-type flip-flop having a data input terminal coupled to receive said phase quadrature pulse signal and a clock input terminal coupled to receive said successive second pulses generated by said second bidirectional edge detection circuit, for producing a second output pulse signal;

first exclusive-OR gate circuit means coupled to receive said in-phase pulse signal and said first output pulse signal from the first D-type flip-flop;

second exclusive-OR gate circuit means coupled to receive said phase quadrature pulse signal and said second output pulse signal from the second D-type flip-flop;

third exclusive-OR gate circuit means coupled to receive said in-phase pulse signal and said phase quadrature pulse signal from said first and second limiter circuits respectively;

fourth exclusive-OR gate circuit means coupled to receive respective output pulse signals produced by said first and third exclusive-OR gate circuit means, for producing a first demodulated digital signal;

fifth exclusive-OR gate circuit means coupled to receive respective output pulse signals produced by said second and third exclusive-OR gate circuit means, for producing a second demodulated digital signal; and demodulated signal combining circuit means for combining said first and second demodulated digital signals to obtain a final demodulated digital signal.

* * * * *